(12) United States Patent
Follingstad

(10) Patent No.: US 9,664,864 B2
(45) Date of Patent: May 30, 2017

(54) METHOD FOR TERMINATING HIGH FIBER COUNT CABLES

(71) Applicant: CommScope Technologies LLC, Hickory, NC (US)

(72) Inventor: Michael Jay Follingstad, Prior Lake, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 15/290,552

(22) Filed: Oct. 11, 2016

(65) Prior Publication Data

US 2017/0102504 A1    Apr. 13, 2017

Related U.S. Application Data

(60) Provisional application No. 62/239,396, filed on Oct. 9, 2015, provisional application No. 62/250,166, filed on Nov. 3, 2015.

(51) Int. Cl.
| | | |
|---|---|---|
| *G02B 6/40* | (2006.01) | |
| *G02B 6/44* | (2006.01) | |
| *G02B 6/38* | (2006.01) | |

(52) U.S. Cl.
CPC ......... *G02B 6/3885* (2013.01); *G02B 6/3879* (2013.01); *G02B 6/406* (2013.01); *G02B 6/4476* (2013.01); *G02B 6/4477* (2013.01)

(58) Field of Classification Search
None
See application file for complete search history.

(56) References Cited

U.S. PATENT DOCUMENTS

| | | | |
|---|---|---|---|
| 5,997,186 A * | 12/1999 | Huynh | G02B 6/4446 385/135 |
| 6,885,798 B2 | 4/2005 | Zimmel | |
| 7,251,411 B1 * | 7/2007 | Lu | G02B 6/4475 385/103 |
| 9,519,114 B2 | 12/2016 | Zimmel et al. | |
| 2006/0233506 A1 * | 10/2006 | Noonan | G01M 11/33 385/134 |
| 2007/0212009 A1 * | 9/2007 | Lu | G02B 6/4472 385/135 |
| 2008/0175548 A1 * | 7/2008 | Knecht | G02B 6/4475 385/100 |

(Continued)

*Primary Examiner* — Jerry Rahll
(74) *Attorney, Agent, or Firm* — Merchant & Gould P.C.

(57) ABSTRACT

Aspects and techniques of the present disclosure relate to a method for mating a first high fiber count optic cable including a first plurality of optical fiber ribbons with a second high fiber count optic cable including a second plurality of optical fiber ribbons. The method can include: stripping a portion of the first and second high fiber count optic cables; cutting-off each of the first and second pluralities of optical fiber ribbons at different lengths such that cut ends of each of the first and second pluralities of optical fiber ribbons are staggered relative to one another; installing a first and second plurality of multi-fiber connectors respectively on the cut ends; optically coupling the first and second plurality of multi-fiber connectors; and mounting a protective sleeve over exposed portions of the first and second pluralities of optical fiber ribbons of the first and second high fiber count optic cables.

22 Claims, 4 Drawing Sheets

(56) References Cited

U.S. PATENT DOCUMENTS

| | | | |
|---|---|---|---|
| 2009/0060421 A1* | 3/2009 | Parikh | G02B 6/4444 385/71 |
| 2013/0163932 A1* | 6/2013 | Cooke | G02B 6/4472 385/76 |
| 2013/0209041 A1* | 8/2013 | Szilagyi | B29D 11/0075 385/78 |
| 2014/0219613 A1* | 8/2014 | Nielson | G02B 6/3885 385/78 |
| 2014/0219621 A1* | 8/2014 | Barnette, Jr. | G02B 6/4439 385/135 |
| 2014/0241676 A1* | 8/2014 | Smith | G02B 6/4479 385/100 |
| 2015/0268434 A1* | 9/2015 | Barnette, Jr. | G02B 6/4472 385/135 |
| 2016/0103290 A1* | 4/2016 | Loeffelholz | G02B 6/3897 385/95 |

\* cited by examiner

METHOD FOR TERMINATING HIGH FIBER COUNT CABLES

CROSS REFERENCE TO RELATED APPLICATIONS

This application claims the benefit of U.S. Provisional Patent Application No. 62/239,396, filed Oct. 9, 2015, and U.S. Provisional Patent Application No. 62/250,166, filed Nov. 3, 2015, which applications are hereby incorporated by reference in their entireties.

TECHNICAL FIELD

The present disclosure relates generally to fiber optic cables and optical fiber communication systems. More particularly, the present disclosure relates to an assembly for providing axial strain relief between two high fiber optic cables mated together using standard connector platforms.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another. Connectors are typically installed on fiber optic cables in the factory through a direct termination process.

The present invention provides an arrangement for transferring stress across a protective sleeve without applying stress to fibers or adapters of fiber optic cables themselves.

SUMMARY

One aspect of the present disclosure relates to a fiber optic assembly and a method of making the fiber optic assembly having two optic cables with standard industry connectors at staggered lengths, in which a protective sleeve is placed over the two optic cables. In such a configuration, the two optic cables may be pulled through a narrow duct without applying an axial load to optical fibers therein or adapters because the axial load is transferred across the protective sleeve.

One aspect of the present disclosure relates to a method for mating a first high fiber count optic cable including a first plurality of optical fiber ribbons with a second high fiber count optic cable including a second plurality of optical fiber ribbons.

The method includes the steps of stripping a portion of the first and second high fiber optic cables to expose the first and second pluralities of optical fiber ribbons; cutting-off each of the first and second pluralities of optical fiber ribbons at different lengths such that cut ends of each of the first and second pluralities of optical fiber ribbons are staggered relative to one another; installing a first and second plurality of multi-fiber connectors respectively on the cut ends of the first and second pluralities of optical fiber ribbons; optically coupling the first and second plurality of multi-fiber connectors together via a plurality of optical fiber adapters; and mounting a protective sleeve over exposed portions of the first and second pluralities of optical fiber ribbons of the first and second high fiber count optic cables.

Another aspect of the present disclosure relates to an example fiber optic assembly including: a first fiber optic cable including a first plurality of optical fiber ribbons having ends that are each staggered relative to one another; at least one first fiber optic cable strength member extending along the first plurality of optical fiber ribbons; a first jacket surrounding the at least one first fiber optic cable strength member; a first plurality of multi-fiber connectors each terminating a respective one of the first plurality of optical fiber ribbons that are exposed at the end portion of the first fiber optic cable; a protective sleeve being anchored to the first fiber optic cable and positioned longitudinally thereabout; a second fiber optic cable including a second plurality of optical fiber ribbons having ends that are each staggered relative to one another; at least one second fiber optic cable strength member extending along the second plurality of optical fiber ribbons; a second jacket surrounding the at least one second fiber optic cable strength member, the second jacket being removed from an end portion of the second fiber optic cable to expose the second plurality of optical fiber ribbons and the at least one second fiber optic cable strength member; a second plurality of multi-fiber connectors each terminating a respective one of the second plurality of optical fiber ribbons that are exposed at the end portion of the second fiber optic cable; the protective sleeve further being anchored to the second fiber optic cable; and a plurality of fiber optic adapter devices each being coupled to a respective one of both the first and second plurality of multi-fiber connectors to provide an optical connection therebetween and to mate the first and second fiber optic cables together.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
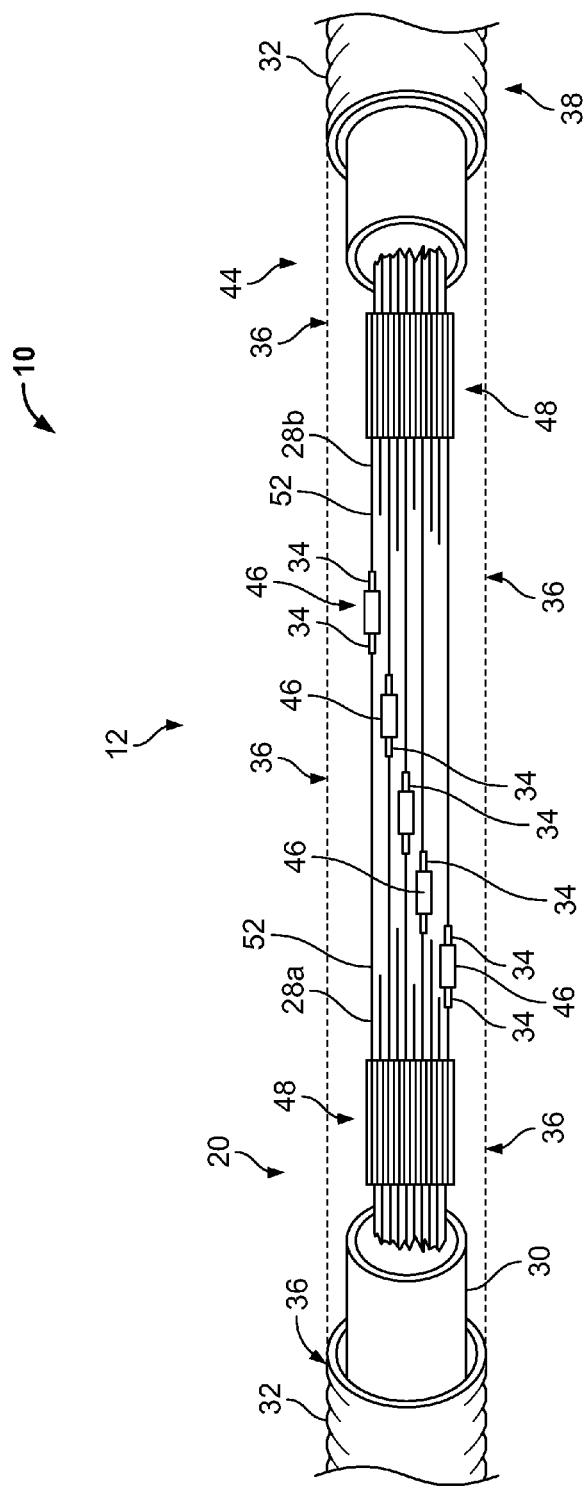
FIG. 1 is a schematic view of a fiber optic assembly including first and second fiber optic cables in accord with the principles of the present disclosure.

FIG. 1 illustrates a fiber optic assembly 10 that provides an interface region 12 between a first high fiber count optic cable 20 and a second high fiber count optic cable 44. The example first high fiber count optic cable 20 includes a first plurality of optical fiber ribbons $28_a$ and the example second high fiber count optic cable 44 includes a second plurality of optical fiber ribbons $28_b$. The first and second pluralities of optical fiber ribbons $28_a$, $28_b$ can each have individual optical fibers extending therethrough.

A portion of the first and second high fiber count optic cables 20, 44 is shown having a stripped portion 52 to expose the first and second pluralities of optical fiber ribbons $28_a$, $28_b$. Ends of the first and second pluralities of optical fiber ribbons $28_a$, $28_b$ can include a plurality of multi-fiber connectors 34 installed thereon. The plurality of multi-fiber connectors 34 are shown optically coupled together via a plurality of optical fiber adapters 46 such that the first and second high fiber count optic cables 20, 44 can be mated together by the plurality of optical fiber adapters 46.

Figure 2:
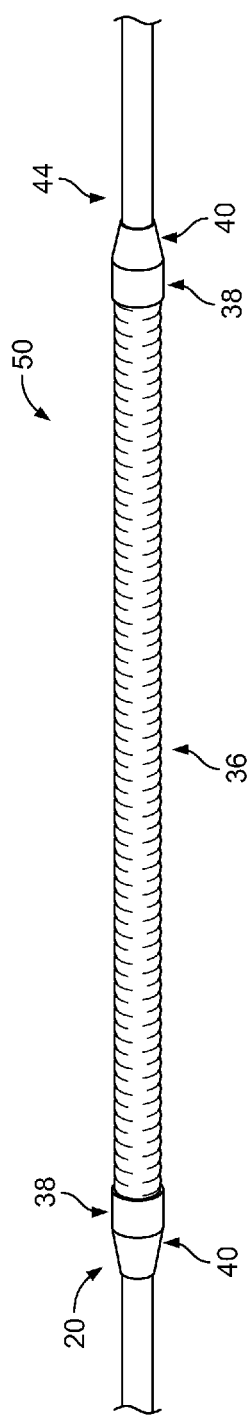
FIG. 2 is a perspective view of a complete fiber optic assembly with a protective sleeve extended over the first and second fiber optic cables shown in FIG. 1.
Figure 3:
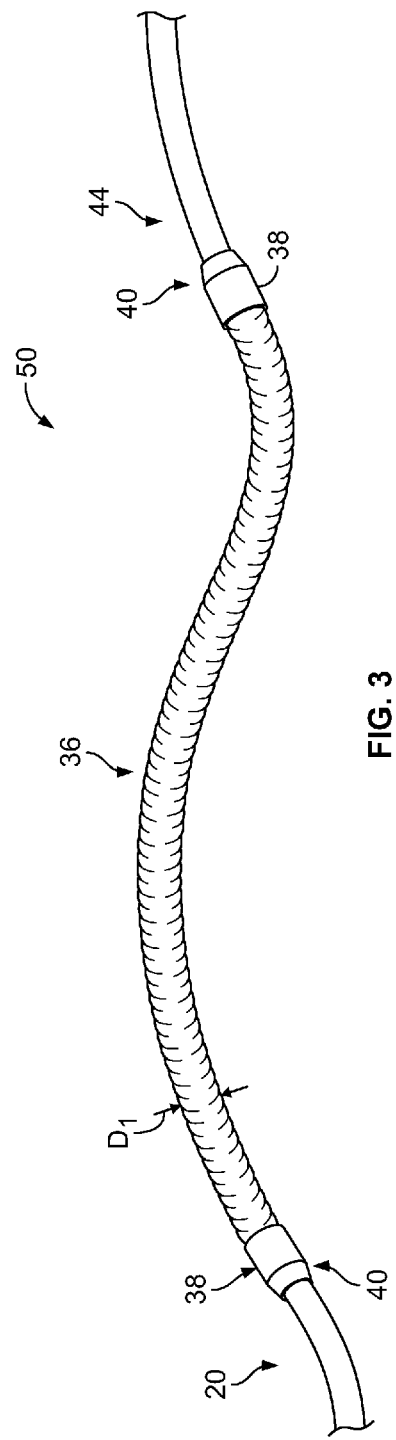
FIG. 3 is a perspective view of the complete fiber optic assembly shown in FIG. 2 illustrating a diameter thereof.

Referring to FIGS. 2-3, a complete fiber optic assembly 50 is illustrated with a protective sleeve 36 (e.g., protective cover) mounted over exposed portions of the first and second pluralities of optical fiber ribbons $28_a$, $28_b$ of the first and second high fiber count optic cables 20, 44. The protective sleeve 36 can be secured to the first and second high fiber count optic cables 20, 44 at respective coupling junctions 40 (e.g., anchoring locations) positioned at jacketed end portions 32 of the first and second high fiber count optic cables 20, 44.

Figure 4:
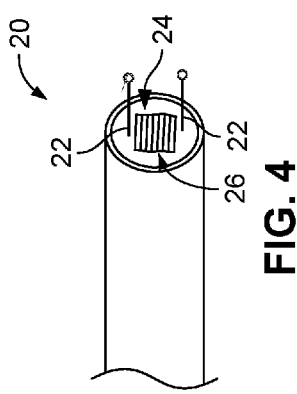
FIG. 4 is a perspective end view of the first fiber optic cable of FIG. 1 including a bundled ribbon matrix and strength members in accord with the principles of the present disclosure.

Turning to FIG. 4, a schematic of the example first high fiber count optic cable 20 is illustrated. Although only the first high fiber count optic cable 20 is depicted, the same can be said of the second high fiber count optic cable 44. Thus, the following description of the first high fiber count optic cable 20 can be equally applied to the second high fiber count optic cable 44.

The first high fiber count optic cable 20 can include strength members 22 and a ribbon matrix 24 in accordance with the principles of the present disclosure. In one example, the ribbon matrix 24 includes approximately twelve ribbons and each ribbon contains twelve optical fibers. In other examples, the ribbon matrix 24 includes approximately twelve ribbons and each ribbon contains about twenty four optical fibers. In certain examples, the ribbon matrix 24 includes approximately six ribbons and each ribbon contains about twenty four optical fibers. Other fiber counts and arrangements can also be configured.

The example first high fiber count optic cable 20 may include a relatively large number of optical fibers (e.g., at least 72, 144, 288, or more fibers) organized within the ribbon matrix 24 in a central portion 26 of the high fiber optic cable 20. In certain examples, the ribbon matrix 24 can be contained within a central buffer tube (not shown). In that way the strength members 22 can be positioned between the buffer tube and an outer jacket 30 of the first high fiber count optic cable 20.

The strength members 22 of the first high fiber optic cable 20 can provide tensile strength and compressive reinforcement to the first high fiber count optic cable 20. The strength members 22 can include reinforcing rods defined by fiberglass reinforced epoxy that provides both tensile and compressive reinforcement. However, other types of strength members, such as aramid fiber/yarn (e.g., Kevlar®) can also be used to provide mainly tensile reinforcement.

Figure 5:
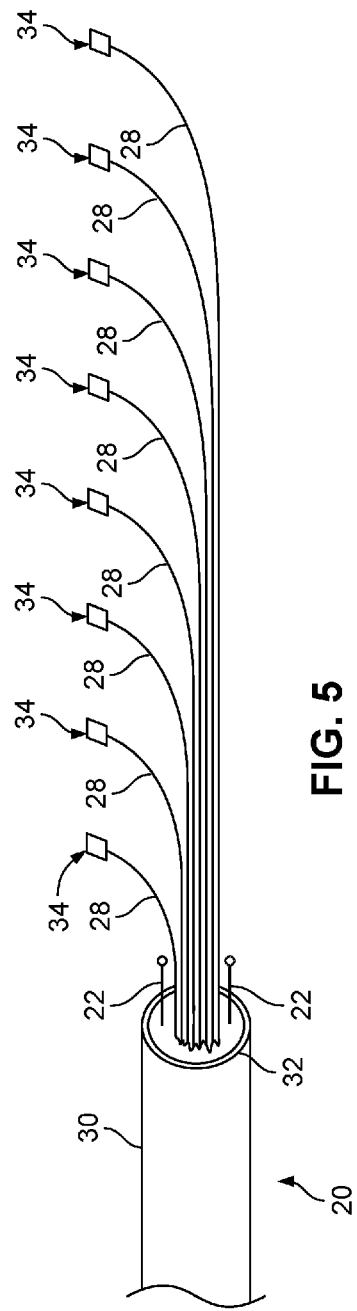
FIG. 5 is a perspective end view of the first fiber optic cable of FIG. 4 including a plurality of optical fiber ribbons at staggered lengths with multi-fiber optical connectors on cut ends thereof.

Referring to FIG. 5, a schematic view of the plurality of optical fiber ribbons 28 of the first high fiber count optic cable 20 is illustrated. In certain examples, a section of the outer jacket 30 may be removed/stripped away from the plurality of optical fiber ribbons 28 so that the plurality of optical fiber ribbons 28 extend beyond a jacketed end portion 32 of the first high fiber optic cable 20. The stripped portion 52 provides access to ends of the plurality of optical fiber ribbons 28 extending beyond the jacketed end portion 32. In the example shown, ends of the plurality of optical fiber ribbons 28 are cut so as to be staggered relative to one another.

As depicted, each of the plurality of optical fiber ribbons 28 of the example first high fiber optic cable 20 are optically coupled to a corresponding multi-fiber connector 34. Example standard multi-fiber connectors include MPO/MTP connectors plugs (e.g., 8, 12 or 24 fiber MPO), alternative connector types are possible each having a multi-fiber ferrule. The multi-fiber connectors 34 can be factory installed.

Ripcords (not shown) can be provided for facilitating tearing away portions of the outer jacket 30 to access the plurality of optical fiber ribbons 28 of the ribbon matrix 24 within the outer jacket 30. As depicted, the outer jacket 30 has a round configuration. In other examples, the cable could have other shapes (e.g., flat cable, butterfly cable, etc.).

The outer jacket 30 is preferably constructed of a polymeric material. In certain examples, the outer jacket 30 can be manufactured of a fire-retardant plastic material. In certain examples, the outer jacket 30 can be manufactured of a low smoke zero halogen material. Example materials for the outer jacket include polyvinyl chloride (PVC), fluorinated ethylene polymer (FEP), polyolefin formulations including, for example, polyethylene, and other materials. The outer jacket 30 can be stripped back to expose fibers at a point of termination or connectorization.

Each of the plurality of optical fiber ribbons 28 has a plurality of optical fibers extending therethrough. The optical fibers can include a coating layer that surrounds a bare glass portion. In one example, the coating layer can have a cladding layer having an outer diameter ranging from 120-130 microns and a core having a diameter ranging from 5-15 micron. The optical fibers can be arranged in a planar array and can be secured together by a matrix material that bonds the fibers in a flat ribbon form. Other examples can have different dimensions.

Figure 6:
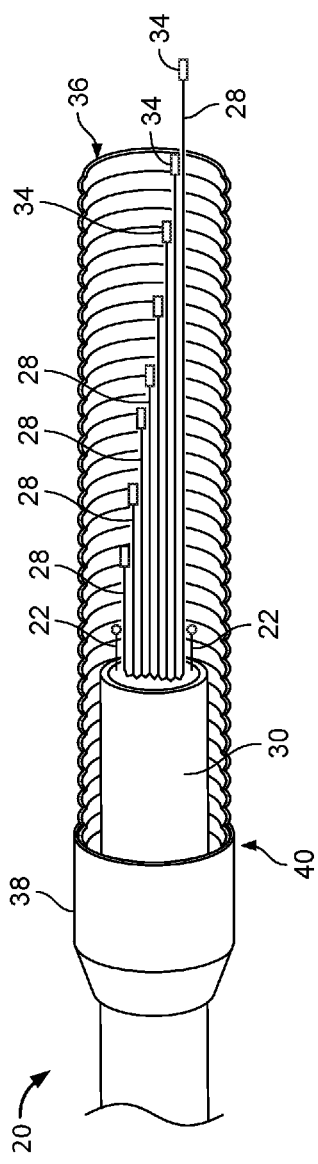
FIG. 6 is a perspective view of the first fiber optic cable shown in FIG. 5 with a protective sleeve over exposed portions of the plurality of optical fiber ribbons of the first fiber optic cable and an anchor nut thereon in accord with the principles of the present disclosure.

Referring to FIG. 6, the example first high fiber count optic cable 20 is shown with the protective sleeve 36 anchored thereto. The protective sleeve 36 may be placed over the plurality of optical fiber ribbons 28 to provide additional tensile reinforcement and environmental protection. The protective sleeve 36 may seal the exposed plurality of optical fiber ribbons 28 and may maintain the plurality of optical fiber ribbons 28 at a desired position with respect to the first high fiber count optic cable 20. In certain examples, the protective sleeve 36 may be completely sealed against the ingress of dirt and moisture to ensure that the protective sleeve 36 is suitable for outside plant applications.

In other examples, the protective sleeve 36 may have a configuration that allows the plurality of optical fiber ribbons 28 to move relative to one another within the protective sleeve 36. In other examples, tensile load (e.g., axial load) on the first high fiber count optic cable 20 does not impart a tensile load on the plurality of optical fiber ribbons 28, adapters, or connectors but can be transfer through to the protective sleeve 36 across the interface region 12 between the first and second high fiber count optic cables 20, 44.

The example first high fiber optic cable 20 may also include a strain relief 38 that may be secured to the protective sleeve 36 at a coupling junction 40 (e.g., anchoring location). In one example, the strain relief 38 may be a heat shrinkable thermoplastic sleeve or wrap. In other examples, the strain relief 38 may include a coupling nut or boot. The protective sleeve 36 may be coupled to the strain relief 38 using adhesive or other attachment technique known in the art. For example, the strain relief 38 may be secured to the protective sleeve 36 by mechanically crimping the strain relief 38 against the first high fiber optic cable 20 or by screw on threads, alternatives are possible.

The strain relief 38 may be mounted around the outer jacket 30 and the strength members 22 of the first high fiber optic cable 20 such that the strength members 22 are embedded into the strain relief 38. In one example, the strain relief 38 can be assembled in field installations. Alternatively, the strain relief 38 can be factory-installed.

When installing the first high optic cable 20, the first high optic cable 20 can withstand a certain load that includes stresses caused by pulling the first high optic cable 20 through, over or around stationary objects such as ducts, corners and conduits. Many installers will carefully meter the force with which they are pulling the first high optic cable 20 throughout the installation to avoid accidentally over stressing the first high optic cable 20. After the first high optic cable 20 has been installed it will be subject to lower loads. The plurality of optical fiber ribbons $28_a$ can be staggered to allow the first high fiber optic cable 20 to maintain a small diameter to ease installation and impart the load on the protective sleeve 36 rather than the optical fibers or adapters.

The protective sleeve 36 may be made of a polymeric material, an elastomeric material, silicone material or metal. The scope of the present disclosure is not intended to be limited to the size, dimension or type of material used for the protective sleeve 36. The protective sleeve 36 can be rigid enough to protect the plurality of optical fiber ribbons $28_a$ of the first high fiber optic cable 20 and also provide strength for pulling the protective sleeve 36. In certain examples, the protective sleeve 36 may be an articulating sleeve that prevents the protective sleeve 36 from bending in a radius smaller than a minimum bend radius and prevents contents of the protective sleeve 36 from being kinked. In some examples, the protective sleeve 36 may be more easily assembled, particularly in field installations. Alternatively, the protective sleeve 36 can be factory-installed.

In certain examples, the first high fiber optic cable 20 may have a branch out configuration such that not all of the plurality of optical fiber ribbons $28_a$ is covered by the protective sleeve 36.

Figure 7:
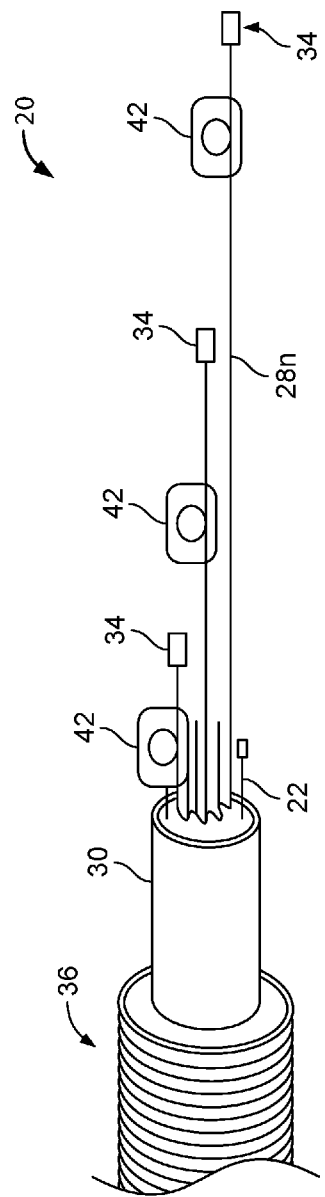
FIG. 7 is a perspective view of the first fiber optic cable shown in FIG. 6 with the protective sleeve rolled back and multiple expansion chambers positioned on the plurality of optical fiber ribbons.

Referring to FIG. 7, a schematic of the example first high fiber count optic cable 20 is depicted with the protective sleeve 36 rolled back and expansion chambers 42 (e.g., fiber expansion devices) mounted to each one of the plurality of optical fiber ribbons $28_a$. An example expansion chamber can include a spool with a loop of fiber forming therearound. The loop of fiber can be sized to fit within the expansion chamber 42 to allow the fiber to extend and contract therein. This may allow the loop of fiber to grow in size without being limited as excess length is incorporated within the loop. An example expansion chamber is described in U.S. Pat. No. 6,885,798, incorporated herein by reference.

The expansion chambers 42 may permit excess fiber length to accumulate on a spool without bending in a radius smaller than a minimum bend radius. In other words, the expansion chambers 42 can be designed so that minimum bend radius requirements of the plurality of optical fiber ribbons $28_a$ are not violated. In some examples, the expansion chambers 42 may be assembled in field installations. Alternatively, the expansion chambers 42 may be factory-installed.

Turning again to FIG. 1, the example first high fiber count optic cable 20 is depicted with the plurality of fiber optic adapters 46 coupled to the multi-fiber connectors 34 of both the first and second high fiber count optic cables 20, 44 to provide an optical connection therebetween.

In the example depicted, the expansion chambers 42 of each one of the first and second high fiber count optic cables 20, 44 are respectively attached together to form an expansion chamber pack 48. In one example, the individual expansion chambers 42 may be secured together by a snap-fit connection interface, alternatives are possible.

Turning again to FIGS. 2-3, strain reliefs 38 are shown secured to the protective sleeve 36 at opposite ends thereof. The staggered configuration of the plurality of optical fiber ribbons 28 provides a cross-dimension $D_1$ including the protective sleeve 36 that is small enough to allow the first and second high fiber count optic cables 20, 44 to fit through standard fiber conduits.

The present disclosure provides a method for protecting the first and second pluralities of optical fiber ribbons $28_{a,b}$ of the first and second high fiber count optic cables 20, 44.

The method may include the steps of: (1) stripping a portion of the first and second high fiber count optic cables 20, 44 to expose first and second pluralities of optical fiber ribbons 28; (2) cutting-off each of the first and second pluralities of optical fiber ribbons 28, the first and second pluralities of optical fiber ribbons 28 each being cut-off at different lengths such that cut ends of each of the first and second pluralities of optical fiber ribbons 28 are staggered relative to one another; (3) installing a first and second plurality of multi-fiber connectors 34 respectively on the cut ends of the first and second pluralities of optical fiber ribbons 28; (4) optically coupling the first and second plurality of multi-fiber connectors 34 together via a plurality of optical fiber adapters 46 such that the first and second high fiber count optic cables 20, 44 are mated together by the plurality of optical fiber adapters 46; and (5) mounting a protective sleeve 36 over exposed portions of the first and second pluralities of optical fiber ribbons 28 of the first and second high fiber optic cables 20, 44, the protective sleeve 36 being secured to the first and second high fiber optic cables 20, 44 at respective first and second coupling junctions 40 positioned at jacketed end portions 32 of the first and second high fiber count optic cables 20, 44.

Systems and methods consistent with the invention make possible the fabrication, installation and testing of cables for passive optical networks. For example, a cable may be spliced using factory integrated termination assemblies to provide compact and environmentally sound breakouts to facilitate easy connection of subscribers to a communications network.

From the forgoing detailed description, it will be evident that modifications and variations can be made without departing from the spirit and scope of the disclosure.

What is claimed is:

1. A method for mating a first high fiber count optic cable including a first plurality of optical fiber ribbons with a second high fiber count optic cable including a second plurality of optical fiber ribbons, the first and second plurality of optical fiber ribbons each having individual optical fibers extending therethrough, the method comprising:
   stripping a portion of the first and second high fiber count optic cables to expose the first and second plurality of optical fiber ribbons;
   cutting-off each of the first and second pluralities of optical fiber ribbons, the first and second pluralities of optical fiber ribbons each being cut-off at different lengths such that cut ends of each of the first and second pluralities of optical fiber ribbons are staggered relative to one another;
   installing a first and second plurality of multi-fiber connectors respectively on the cut ends of the first and second pluralities of optical fiber ribbons;
   optically coupling the first and second plurality of multi-fiber connectors together via a plurality of optical fiber adapters such that the first and second high fiber count optic cables are mated together by the plurality of optical fiber adapters; and
   mounting a protective sleeve over exposed portions of the first and second pluralities of optical fiber ribbons of the first and second high fiber count optic cables, the protective sleeve being secured to the first and second high fiber optic cables at respective first and second anchoring locations positioned at jacketed end portions of the first and second high fiber count optic cables.

2. The method of claim 1, wherein the protective sleeve is first mounted to the anchoring location of the first high fiber count optic cable, the protective sleeve being rolled back on the first high fiber count optic cable prior to optically coupling the first and second plurality of multi-fiber connectors to a respective one of the plurality of optical fiber adapters.

3. The method of claim 2, wherein pulling the protective sleeve over the first and second high fiber count optic cables occurs after optically coupling the first and second plurality of multi-fiber connectors to a respective one of the plurality of optical fiber adapter devices, the protective sleeve having a configuration that allows the first and second plurality of optical fiber ribbons to move relative to one another within the protective sleeve.

4. The method of claim 2, wherein the protective sleeve comprises a polymeric material.

5. The method of claim 2, wherein the protective sleeve comprises metal.

6. The method of claim 1, further comprising placing a first and second plurality of fiber expansion devices on each respective one of the first and second plurality of optical fiber ribbons to permit excess fiber length to accumulate without bending in a radius smaller than a minimum bend radius.

7. The method of claim 6, wherein each of the first and second plurality of fiber expansion devices are respectively secured together by a snap-fit connection interface.

8. The method of claim 1, further comprising securing first and second strain reliefs respectively around strength members of the first and second high fiber count optic cables.

9. The method of claim 8, wherein the first and second strain reliefs are a heat shrinkable thermoplastic strap.

10. The method of claim 8, wherein the first and second strain reliefs are a coupling nut.

11. The method of claim 8, wherein the first and second strain reliefs are mounted respectively to the first and second high fiber count optic cables by a crimping device.

12. The method of claim 8, wherein the first and second strain reliefs are each attached to the protective sleeve at first and second coupling junctions located at opposing ends thereof.

13. A fiber optic assembly comprising:
   a first fiber optic cable including a first plurality of optical fiber ribbons having ends that are each staggered relative to one another;
   at least one first fiber optic cable strength member extending along the first plurality of optical fiber ribbons;
   a first jacket surrounding the at least one first fiber optic cable strength member, the first jacket being removed from an end portion of the first fiber optic cable to expose the first plurality of optical fiber ribbons and the at least one first fiber optic cable strength member;
   a first plurality of multi-fiber connectors terminating a respective one of the first plurality of optical fiber ribbons that are exposed at the end portion of the first fiber optic cable;
   a protective sleeve being anchored to the first fiber optic cable, the first plurality of optical fiber ribbons being free to move relative to one another within the protective sleeve;
   a second fiber optic cable including a second plurality of optical fiber ribbons having ends that are each staggered relative to one another;
   at least one second fiber optic cable strength member extending along the second plurality of optical fiber ribbons;
   a second jacket surrounding the at least one second fiber optic cable strength member, the second jacket being removed from an end portion of the second fiber optic cable to expose the second plurality of optical fiber ribbons and the at least one second fiber optic cable strength member;
   a second plurality of multi-fiber connectors each terminating a respective one of the second plurality of optical fiber ribbons that are exposed at the end portion of the second fiber optic cable;
   the protective sleeve further being anchored to the second fiber optic cable, the second plurality of optical fiber ribbons being free to move relative to one another within the second protective sleeve; and
   a plurality of fiber optic adapters each being coupled to a respective one of both the first and second plurality of multi-fiber connectors to provide an optical connection therebetween and to mate the first and second fiber optic cables together.

14. The fiber optic assembly of claim 13, wherein the plurality of multi-fiber connectors comprises a ruggedized MT connector.

15. The fiber optic assembly of claim 13, further comprising a first and second plurality of fiber expansion devices positioned between first and second ends of each of the first and second pluralities of optical fiber ribbons to permit excess fiber length to accumulate without bending in a radius smaller than a minimum bend radius.

16. The fiber optic assembly of claim 15, wherein each of the first and second plurality of fiber expansion devices are respectively secured together by a snap-fit connection interface.

17. The fiber optic assembly of claim 12, further comprising a first strain relief secured to the at least one first fiber optic cable strength member, and a second strain relief secured to the at least one second fiber optic cable strength member.

18. The fiber optic assembly of claim 17, wherein the first and second strain reliefs are heat shrinkable thermoplastic straps.

19. The fiber optic assembly of claim 17, wherein the first and second strain reliefs are coupling nuts.

20. The fiber optic assembly of claim 17, wherein the first and second strain reliefs are mounted to the first and second fiber optic cables respectively by a crimping device.

21. The fiber optic assembly of claim 13, wherein the protective sleeve is completely sealed against the ingress of dirt and moisture.

22. The fiber optic assembly of claim 13, wherein the protective sleeve is an articulating sleeve that prevents bending in a radius smaller than a minimum bend radius such that contents of the protective sleeve are not kinked.

* * * * *